UNITED STATES PATENT OFFICE.

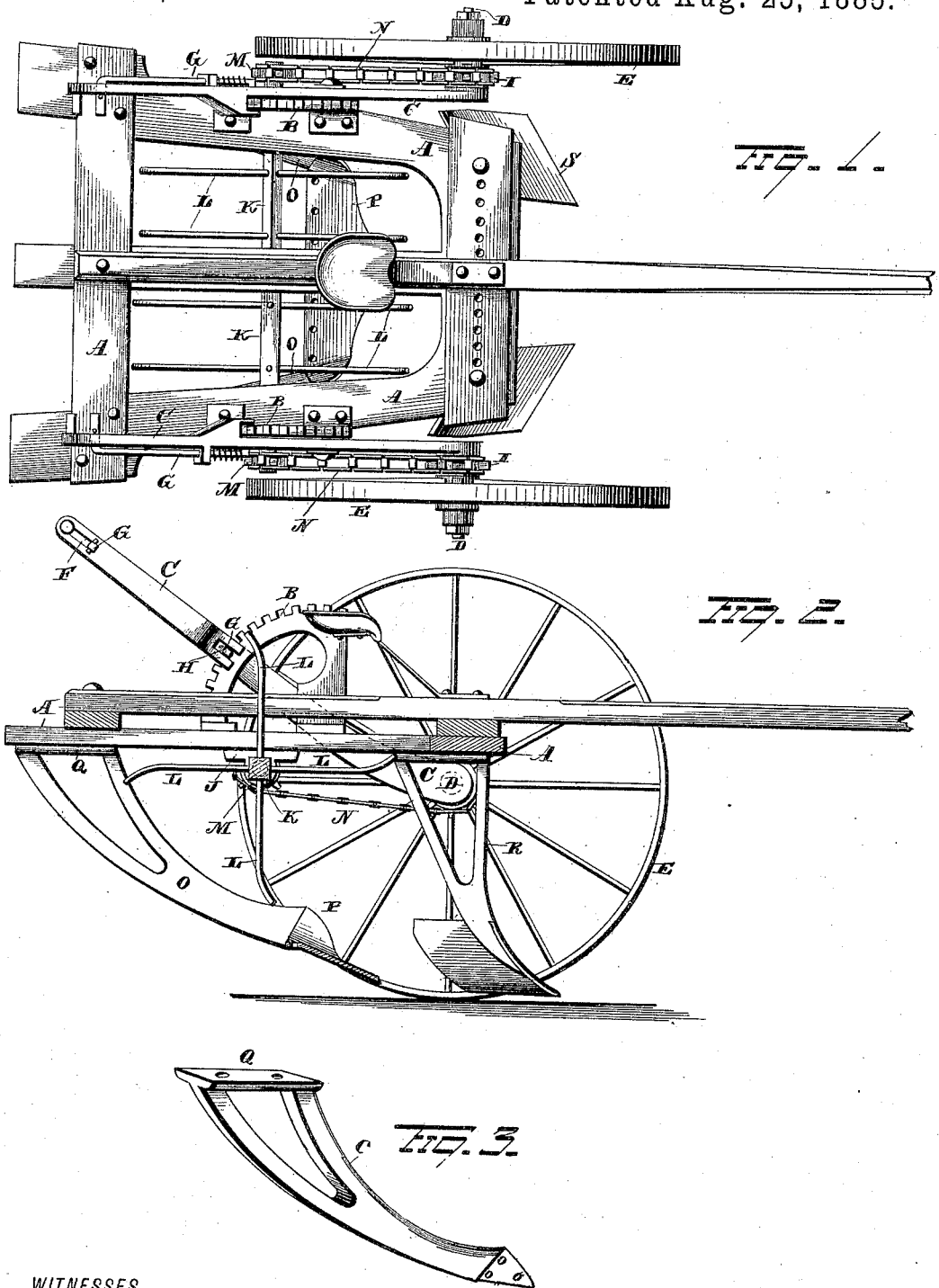

ALANSON ANSLEY, OF GENEVA, NEW YORK.

POTATO-DIGGER.

SPECIFICATION forming part of Letters Patent No. 324,911, dated August 25, 1885.

Application filed November 13, 1884. (No model.)

*To all whom it may concern:*

Be it known that I, ALANSON ANSLEY, of Geneva, in the county of Ontario and State of New York, have invented certain new and useful Improvements in Potato-Diggers; and I do hereby declare the following to be a full, clear, and exact description of the invention, such as will enable others skilled in the art to which it appertains to make and use the same.

My invention relates to an improvement in potato diggers, the object being to provide improved means for securing the shovel or digger in position, and also to provide improved means for pulverizing the earth and raising the potatoes to the surface; and with these ends in view my invention consists in certain features of construction and combinations of parts, as will be hereinafter described and pointed out in the claim.

In the accompanying drawings, Figure 1 is a plan view of my improvement. Fig. 2 is a vertical sectional view thereof, and Fig. 3 is a detached view of one of the standards.

A represents the frame, preferably constructed and shaped as shown, and to the sides of which are secured the segment-bars B.

To the forward posts of the bars B are pivoted the levers C, the lower ends of which are provided with the stub-axles D, adapted to receive the frame-supporting wheels E. The upper ends of the levers C are provided with the elongated slots F, through which are inserted the handles of the spring-actuated dogs G, the lower ends of which also pass through the elongated slots H, formed near the center of the levers, thus permitting the dogs G to engage with the segment-bar as desired. The hub-rims of the wheels E, nearest the levers C, are provided with the sprockets I, which are rigidly secured thereon.

To the central and side beams, a, of the frame A are secured the bearings J, at about midway thereof. In these bearings are journaled the shafts K, which are provided on their faces with the prongs or cleaners L. The outer ends of the shafts K are provided with the rigidly-secured sprockets M. The shafts K are each operated by means of a sprocket-chain, N, which is of sufficient length to form a connecting-chain between the sprockets I and M, thus causing the chain N to revolve with the wheels E and transmit motion to the shafts K, by means of which the prongs are set in motion, thus pulverizing the earth as they come in contact with it and separate the potatoes therefrom.

To the rear portion of the frame A are secured the rear and upper ends of the bifurcated standards O, to the lower forward ends of which is secured the shovel or digger P. The standards are preferably made of metal, and of the shape shown in the drawings, the upper ends being forked or bifurcated and provided with plates Q, which are fastened to the frame, the standards depending forwardly from the plate Q, the forward ends thereof being curved inwardly, to which are secured the ends of the shovel P.

By securing the braces O outwardly from the shovel and securing the upper rear ends to the rear end of the frame, a large open space is left behind the shovel, through which all weeds and vines may pass without clogging.

To the forward part of the frame and on each side thereof are secured the bifurcated standards R, the lower ends of which are slightly curved, and to which are secured in any desired manner the diggers S.

The shovels or diggers can be adjusted to any desired depth by means of the levers C— as, for example, when it is desired to have the shovel enter the ground deeply the levers are thrown back, thus causing the wheels to move forward and a lowering of the frame.

To effect a shallow entry of the shovels into the ground, the levers are thrown forward, thus causing the same to assume a vertical position, or as near such as may be desired, thus raising the frame and the shovels.

Having fully described my invention, what I claim as new, and desire to secure by Letters Patent, is—

In a potato-digger, the combination, with a frame having a depending shovel or digger, the toothed segments rigidly secured to said frame, the levers pivotally secured to said segments, and each provided at its lower end with a short axle, the spring-actuated dogs for locking the levers in position, and the ground-wheels journaled on the short axle and provided with sprocket-wheels, of the shafts K, journaled in the frame and provided with prongs, sprocket-wheels secured to said shafts, and drive-chains connecting the sprocket-wheels on the shaft with the sprocket-wheels on the ground-wheels, all of the above parts constructed and combined substantially as set forth.

In testimony whereof I have signed this specification in the presence of two subscribing witnesses.

ALANSON ANSLEY.

Witnesses:
W. T. SCOTT,
THOS. H. CHEW.